Feb. 27, 1962  Y. C. ZIA  3,022,976
SAFETY ADJUSTABLE-SEAT MOUNTING FOR FRONT SEAT OF A VEHICLE
Filed Sept. 6, 1960

INVENTOR.
YEE C. ZIA
BY
Robert K. Youtie
ATTORNEY

United States Patent Office 3,022,976
Patented Feb. 27, 1962

3,022,976
SAFETY ADJUSTABLE-SEAT MOUNTING FOR FRONT SEAT OF A VEHICLE
Yee C. Zia, 6 Sheffield Drive, Levittown, N.J.
Filed Sept. 6, 1960, Ser. No. 53,994
2 Claims. (Cl. 248—430)

This invention relates to improvements in vehicles, and is especially concerned with improved seat-mounting means for vehicles.

As is well-known, bodily injuries in automobile accidents commonly result from the front-seat occupants being crushed by the steering column or dash panel, especially in a front-end collision. While the use of safety belts may be helpful in holding an occupant against the seat, to reduce certain types of injuries, safety belts are not adequately effective against the above-mentioned chest-crushing injuries, serving only to hold the occupant in position between the fixed seat and rearwardly moving steering column or dash panel.

Accordingly, it is one object of the present invention to provide a radically new safety-mounting construction for a vehicle which substantially eliminates the possibility of body-crushing injuries by automatically releasing the seat for immediate rearward motion under forces greater than those normally encountered in conventional driving.

tI is a further object of the present invention to provide a safety mounting for a vehicle seat having the advantageous characteristics mentioned in the preceding paragraph, which may be quickly and easily adjusted forwardly and rearwardly to any selected position for maximum comfort, and which includes a unique construction releasably holding the seat in its selected position, while permitting immediate, automatic seat movement under abnormal conditions to avoid injury in collision.

It is still another object of the present invention to provide a vehicle-seat mounting of the type described which is extremely simple in construction, entirely reliable and durable throughout a long useful life, and which can be manufactured, installed and maintained at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figure 1:
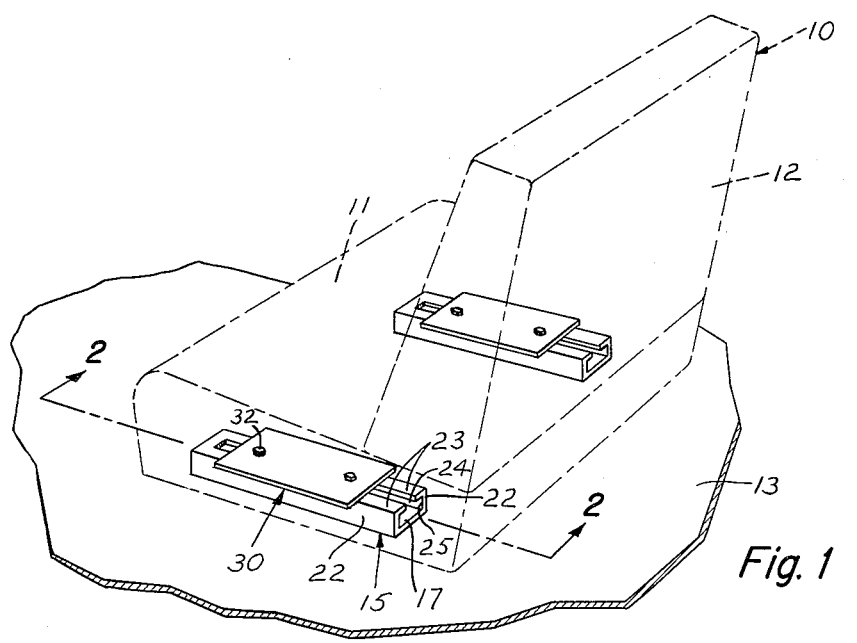
FIGURE 1 is a top perspective view showing a vehicle-seat mounting of the present invention, a vehicle seat being shown in phantom.

Referring now more particularly to the drawings, a vehicle seat is there generally designated 10 and includes a generally horizontally disposed lower part 11, and an upstanding back 12. The seat 10 is located in spaced relation over a generally horizontally disposed floor 13. The seat and floor may be conventional.

Interposed between the floor 13 and underside of the seat 10 is the seat-mounting means of the present invention, generally designated 15. A pair of substantially identical seat-mounting units are shown in FIGURE 1, one being located adjacent to each side of the seat 10. A detailed description of a single seat-mounting unit will suffice.

Figure 2:
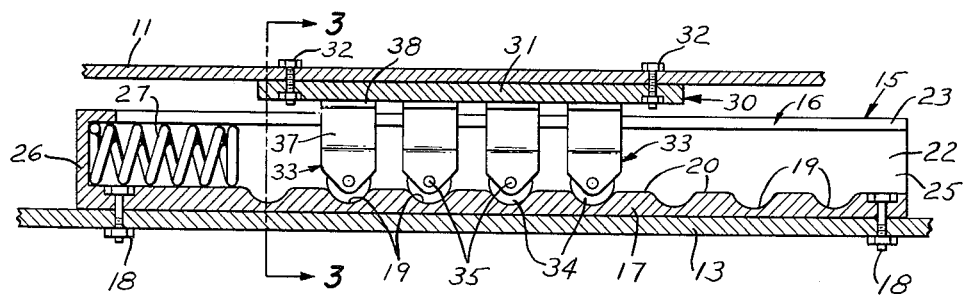
FIGURE 2 is a sectional elevational view taken substantially along the line 2—2 of FIGURE 1.
Figure 3:
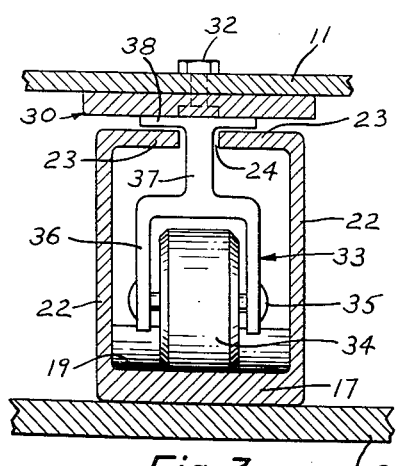
FIGURE 3 is a sectional view taken substantially along the line 3—3 of FIGURE 2.

A seat-mounting unit is best seen in FIGURE 2, and there shown as comprising a generally forwardly and rearwardly extending, elongate track 16 secured fast to the floor 13 and facing upward therefrom. The track 16 includes an elongate, longitudinally extending bottom wall 17 resting on the upper surface of floor 13 and anchored securely thereto, as by fasteners 18. In its upper surface, the bottom wall 17 may be provided with a plurality of spaced, vertical depressions or depressed regions 19. That is, the bottom wall 17 is formed with a series or row of forwardly and rearwardly spaced-apart depressions 19, which depressions or depressed regions merge smoothly with the raised intermediate regions 20, so that the upper surface of the bottom wall 17 may be considered generally wavy or undulant.

Upstanding from and extending forwardly and rearwardly along opposite sides of the track bottom wall 17 are track side walls 22; and, an inturned, upper-edge flange or retaining lip 23 extends inward from the upper edge of each track side wall 22. That is, the inturned upper retaining flanges 23 extend forwardly and rearwardly in generally coplanar horizontal disposition, being spaced apart from each other to define a slot 24 opening vertically between the interior and exterior of track 16.

The rear end of track 16 may be open, as at 25, while a front-end wall or closure 26 extends entirely across the track 16 between the bottom wall 17, side walls 22 and top flanges 23. A resiliently deflectable cushioning device, such as a coil compression spring 27, is arranged longitudinally wtihin the track 16 having its forward end secured by any suitable means in abutting engagement with the closed track front-end wall 26.

Depending from the underside of the lower seat portion 11 is a rolling mechanism, generally designated 30. The rolling mechanism includes a longitudinally or forwardly and rearwardly extending plate 31 anchored fast to the underside of the lower seat portion 11 by suitable fasteners 32 and located directly above the associated track 16. Depending from the plate or bar 31 into the track 16 are a plurality of forwardly and rearwardly spaced roller assemblies 33.

Each roller assembly 33 includes a rollable element or wheel 34 having a generally horizontal, laterally extending journal axle 35. A downwardly extending bifuracted or forked member 36 straddles each wheel 34, and includes an upstanding bar or shank 37 of reduced lateral extent passing spacedly upward through and beyond the slot 24. A fastening enlargement or head 38 is provided on the upper end of the upstanding bar 37 and secured, as by welding or other suitable means, to the underside of plate 31. It will be noted that the enlarged bifuracted region 36 is of a lateral extent incapable of vertical passage through the slot 24, and is spaced below the flanges 23 sufficiently to permit to permit substantial upward vertical movement of the wheel 34, for a purpose appearing presently.

The depressed regions 19 are regularly spaced along the track bottom wall 17; and, the roller assemblies 33 are regularly spaced forwardly and rearwardly equal to the spacing of the depressed regions. However, the roller assemblies 33 are less in number than the depressed regions 19, and occupy considerably less forward-and-rearward space than the depressed regions.

It will now be appreciated that the rolling mechanism 30 is movable forwardly and rearwardly along the track 16, as by elevation from the illustrated position to a position with the wheels 34 above the level of the raised portions 20 between the depressions 19. In this condition, the rolling mechanism 30 may be entirely withdrawn rearward from the track 16, or may be moved forward into end engagement with the resilient cushioning means or spring 27. Also, the rolling means 30 may be lowered to place the individual rollers 40 in any selected contiguous group of depressions 19 for forward-and-rearward adjustment of the seat 10.

The configuration of depressions 19 and radius of wheels 34 is designed such that the wheels are held in a selected group of depressions by normal gravitational forces on the seat 10, such as the weight of the seat and occupants thereof. However, the design of depressions 19 and roller assemblies 33 is such that an abnormal component of force in the forward or rearward direction is sufficient to roll the rolling mechanism up and out of the depressions for movement along the track 16. Should the horizontal component of force against the seat 10 be forward, the rolling mechanism 30 will move into engagement with the resilient cushioning spring 27, the latter serving to propel the rolling mechanism and seat rearward. Of course, if the horizontal component of force against the seat 10 is rearward, the rolling mechanism is free to move rearward as far as required, even out of the track 16.

From the foregoing, it will be understood that the seat-mounting mechanism 15 is quickly and easily adjustable for maximum driving comfort of the occupant, and affords the additional, very important feature that the seat automatically shifts rearward in the event of collision to prevent or minimize possible injury to the occupants.

Of course, it is preferred that the occupants employ safety belts in conjunction with the instant safety-seat mounting for maximum effectiveness.

While the track 16 and roller mechansim 30 are advantageously arranged in the illustrated and described manner, it is appreciated that variations in construction may be employed. For example, it may be possible to invert the mounting mechanism 15, such that the track 16 faces downward and the roller assemblies 33 extend upward from the floor. In such rearrangement, it would be desirable to locate the movement-limiting means 27, 26 rearward to cushion and limit forward seat motion.

It will now be understood that the present invention provides a safety vehicle-seat mounting which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. In a vehicle, the combination comprising a floor, a front seat over said floor, and mounting means for safely and adjustably mounting said seat on said floor, said mounting means comprising a forwardly and rearwardly extending upwardly facing track secured to said floor, said track having a series of upwardly facing depressed regions provided therein, laterally spaced retaining means extending longitudinally along opposite sides of said track fixedly secured thereto and spaced vertically above said track, a series of roller carriers depending from said seat between said retaining means toward said track, rotatable rollers carried by said roller carriers in rolling engagement with said track to mount said seat for forward and rearward movement relative to said track, said depressed track regions being configured and arranged to selectively gravitationally receive said rollers to adjustably position said seat relative to said track, the lower region of each roller carrier being enlarged to a lateral dimension greater than the spacing between said retaining means to prevent upward withdrawal between the latter, and said retaining means being spaced sufficiently above said track for free movement therealong of the rollers both forwardly and rearwardly and vertically into and out of depressed regions without engagement of said enlarged roller-carrier region and said retaining means, whereby said depressed regions are adapted to retain said rollers under normal gravity forces on said seat and to release said rollers for free rolling movement along said track without engagement of said retaining means and lower roller-carrier region under abnormal forward and rearward forces imparted to said seat.

2. The combination according to claim 1, in combination with resiliently compressible means fixed in the forward region of said track and engageable with the forwardmost roller carrier to limit and cushion forward seat movement and effect rearward seat movement, the rearward end of said track being open to permit unlimited rearward seat movement.

References Cited in the file of this patent
UNITED STATES PATENTS

| | | |
|---|---|---|
| 1,802,609 | Krause | Apr. 28, 1931 |
| 1,873,525 | Allbright | Aug. 23, 1932 |
| 2,102,979 | Smith | Dec. 21, 1937 |
| 2,109,728 | Kovach | Mar. 1, 1938 |
| 2,304,781 | Dillon | Dec. 15, 1942 |
| 2,346,895 | Bergman | Apr. 18, 1944 |
| 2,430,141 | Reeves | Nov. 4, 1947 |
| 2,818,909 | Burnett | Jan. 7, 1958 |
| 2,850,073 | Smith | Sept. 2, 1958 |
| 2,900,036 | Blake | Aug. 18, 1959 |

FOREIGN PATENTS

| | | |
|---|---|---|
| 10,109 | Great Britain | 1889 |
| 1,744 | Great Britain | 1899 |
| 810,471 | Germany | Aug. 9, 1951 |